United States Patent [19]
Louder et al.

[11] 3,898,153

[45] Aug. 5, 1975

[54] CATALYTIC REFORMING PROCESS WITH SULFUR REMOVAL

[75] Inventors: Kenneth E. Louder, Wilmington, Del.; William A. Ackerman; Irene F. Kress, both of Media, Pa.

[73] Assignee: Sun Oil Company of Pennsylvania, Philadelphia, Pa.

[22] Filed: Nov. 23, 1973

[21] Appl. No.: 418,504

[52] U.S. Cl. .............. 208/89; 208/91; 208/211; 208/262
[51] Int. Cl... C10g 25/00; C10g 23/00; C10g 31/14
[58] Field of Search .......... 208/88, 89, 91, 99, 102, 208/138, 139, 134, 211, 213, 262

[56] References Cited
UNITED STATES PATENTS

| | | | |
|---|---|---|---|
| 2,522,065 | 9/1950 | Short | 208/213 |
| 2,769,761 | 11/1956 | Annable et al. | 208/89 |
| 2,772,212 | 11/1956 | Seyfried | 208/211 |
| 2,856,347 | 10/1958 | Seelig et al. | 208/91 |
| 2,959,538 | 11/1960 | Weikart et al. | 208/212 |
| 2,967,819 | 1/1961 | Leum et al. | 208/88 |
| 3,306,841 | 2/1967 | Ward | 208/134 |
| 3,574,091 | 4/1971 | Hayes | 208/139 |
| 3,649,524 | 3/1972 | Derr et al. | 208/139 |

*Primary Examiner*—Delbert E. Gantz
*Assistant Examiner*—James W. Hellwege
*Attorney, Agent, or Firm*—George L. Church; Donald R. Johnson; Paul Lipsitz

[57] ABSTRACT

An improved catalytic reformer system wherein chloride compounds are removed from the feed, sulfur compounds contained in the total feed are converted to $H_2S$ in a hydrodesulfurization zone and the $H_2S$ is removed in an adsorbing zone containing a solid adsorbent.

6 Claims, 1 Drawing Figure

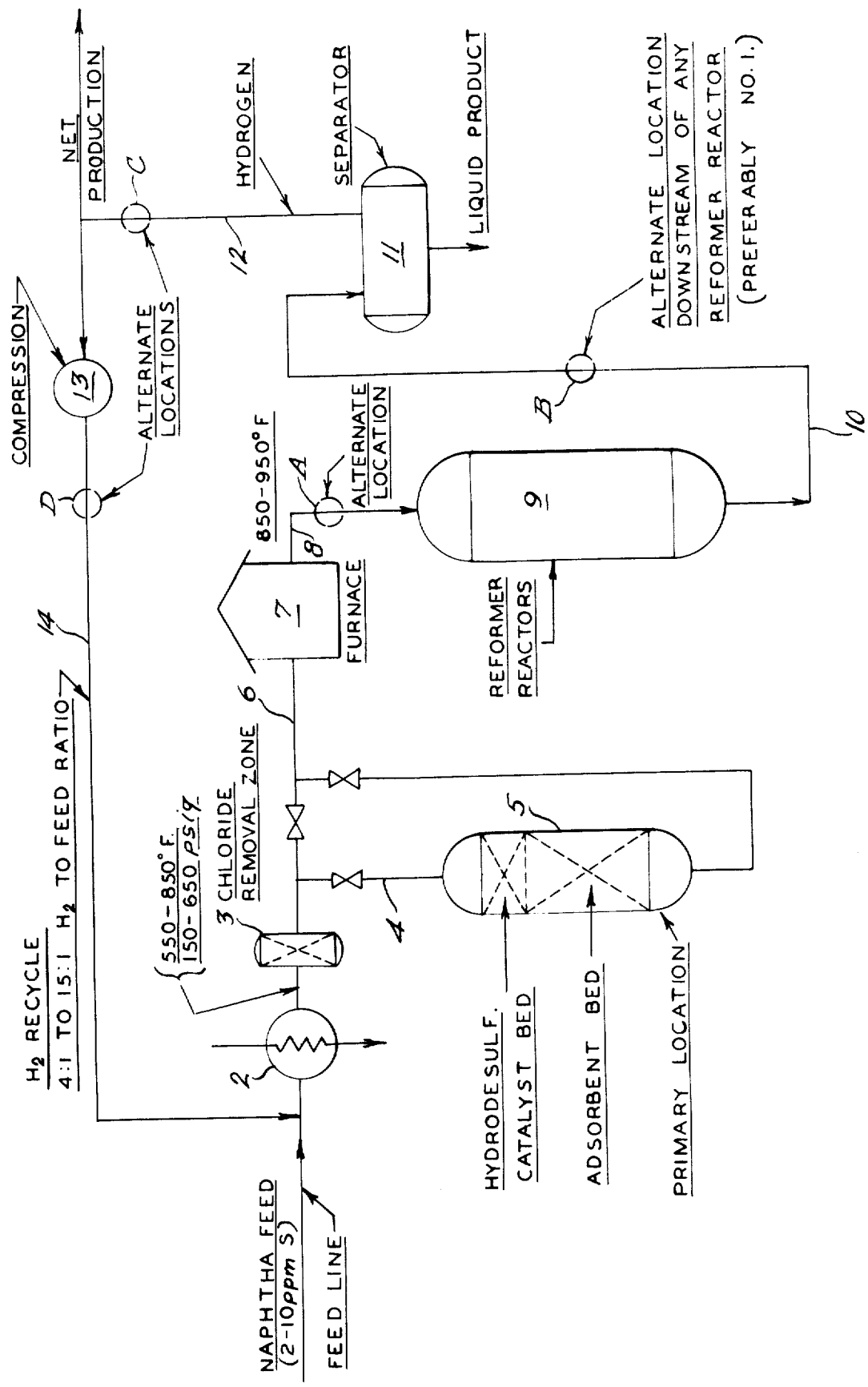

CATALYTIC REFORMING PROCESS WITH SULFUR REMOVAL

BACKGROUND OF THE INVENTION

1. Field of the Invention

This invention relates to improvements in the catalytic reforming of naphthas. More particularly, it relates to the removal of residual sulfur, organic sulfur compounds and $H_2S$, from partially pretreated reformer feed by either treatment of the total reformer feed including hydrogen recycle or treatment of the hydrogen recycle alone utilizing desulfurization catalysts and/or an adsorbent such as zinc oxide to remove sulfur, especially hydrogen sulfide, from said streams.

2. Description of the Prior Art

The higher boiling part of the gasoline fraction contained naturally in crude oil has such a low octane number that it is necessary to convert it to higher octane number gasoline by the process of catalytic reforming. Likewise, 180°–400°F. heavy gasoline produced by hydrocracking has a low octane and it too must be reformed. Reforming of heavy, or selected fractions, of catalytically cracked gasoline is also practiced to improve its octane number.

Many catalytic reforming processes are commercially available such as Platforming (UOP), Ultraforming (Std. Indiana), Houdryforming (Houdry Process and Chemical Co.), Catforming (Atlantic), Powerforming (Esso) and others. These reforming processes are basically all the same, at least with respect to the reactions which occur such as dehydrogenation of napthenes, e.g., cyclohexane being converted into benzene and hydrogen, dehydroisomerization of naphtenes with side chains, e.g., dimethylcyclopentane being converted to methylcyclohexane and then to toluene, dehydrocyclization of paraffins, e.g., n-hexane is converted into cyclohexane and then to benzene, isomerization of paraffins, e.g., heptane going to methylhexane, cracking and hydrogenation of paraffin, e.g., decane cracking and combining with hydrogen to produce normal and isopentane, hydrogenation of any olefins present and hydrodesulfurization of sulfur compounds, e.g., thiophene plus hydrogen resulting in hydrogen sulfide and butanes. The dehydrogenation of naphthenes occurs very rapidly in the catalytic reforming process, and the isomerization of naphthenes and paraffins is also quite rapid. Thus, these reactions predominate and slower cyclization and hydrocracking reactions become significant mainly at severe conditions of low space velocity, high pressure and high temperature. Cyclization favors a low temperature. Since hydrogenation and dehydrogenation occur at the same time, the production of hydrogen, which is recycled in the process, is available for the hydrogenation reactions. Most processes use a platinum catalyst which contains between 0.3 and 0.8% platinum, and up to 1% of a halogen may be used as a promoter to regulate the acidity at the cracking and isomerization sites on the alumina support of the catalyst.

For best performance, catalytic reformers upgrading low octane naphtha to high octane gasolines require low sulfur levels in the feed, preferably less than 1 ppm. Some reformers are equipped with feed desulfurizers that cannot achieve the desired low sulfur levels because of temperature or hydrogen recycle limitation or poor hydrogen sulfide stripping. Considerable expense is usually encountered in trying to correct these limitations, and in some cases it means installing a new desulfurization plant and in others a large stripping column.

SUMMARY OF THE INVENTION

It has now been found that residual sulfur can be removed from partially pretreated reformer feed by passing the total reformer feed including hydrogen recycle over a bed of desulfurization catalysts followed by an adsorbent such as zinc oxide or over zinc oxide alone at temperatures preferably above 600°F. In another embodiment, the adsorbent may be used alone downstream of any reformer reactor to adsorb $H_2S$ produced from the conversion of sulfur compounds in the reformer section. In a further embodiment, the adsorbent may be used alone in the recycle hydrogen stream either before or after compression of said stream to remove hydrogen sulfide contained therein.

Therefore, it is an object of the present invention to provide an improved catalytic reforming process with enhanced sulfur removal so as to improve the upgrading of low octane naphtha taking place therein and to increase the life and enhance the activity of the catalyst being used, which is often very expensive.

It is a further object of the invention to provide a reforming process combined with an adsorbing process to remove hydrogen sulfide to levels of 0.2 ppm in reformer feed as compared to 0.5 to 1.0 ppm levels achieved in conventional strippers.

These and other advantages will be more readily understandable upon review of the detailed description which follows.

DESCRIPTION OF THE DRAWING

The drawing shows the preferred flow diagram of the combination reforming-sulfur removing system of the present invention with the hydrodesulfurization catalyst bed-adsorbent bed being pictured upstream of the reformer feed heater, said location being preferred. Alternate locations for the adsorbent bed alone are shown at points A between the heater and the reformer reactor, B in the outlet stream of the reformer reactor before the liquid separator, C in the hydrogen recycle stream prior to the compression of said stream, and D in the hydrogen recycle stream between the compressor and the point where the recycle mixes with the naphtha feed. It is also envisioned that the adsorbent alone may be placed in a void space in an existing reformer reactor.

Naphtha feed usually containing between 1–10 ppm of organic sulfur and/or $H_2S$ enters the process through the feed line and is heated through heat exchange to temperatures of between 550° and 850°F. at a pressure of from 150 to 650 psig. This heated naphtha feed then flows through a chloride removal zone 3 and via line 4, through a combination hydrodesulfurization catalyst bed and adsorbent bed wherein the normal 1 to 10 ppm organic sulfur is converted to $H_2S$ which is then scavenged out of the naphtha stream together with $H_2S$ entering with the feed and/or recycle $H_2$ by the adsorbent, preferably zinc oxide. The treated naphtha feed then passes via line 6 to the feed heater 7 wherein the temperature is raised to a level of 850° to 950°F. or that required to meet objectives of reforming operation. The feed exits said heater through line 8 and enters the reformer reactor 9 which is of conventional configuration and contains commercially available platinum reforming catalyst. These platinum reforming catalysts may contain second metals such as rhenium or iridium. Products leave the reformer reactor via line 10 and pass into the product separator 11 wherein the liquid product is withdrawn from the bottom and hydrogen recycle is taken overhead to be recycled and compressed to join the naphtha feed via line 12, compressor 13, and line 14. The combined naphtha feed hydrogen recycle then passes through the system as previously described.

Preferred location of the adsorbent-hydrodesulfurization unit is upstream of the furnace and it operates preferably above 600°F. and treats total feed and hydrogen recycle to remove the sulfur contained therein. This location is preferred over location A since at temperatures of 850° to 950° hydrocracking reactions may occur over either the desulfurization catalyst or the adsorbent although location A is still operable and would achieve some of the advantages of the present invention. Location B, C and D are all operable and would remove sulfur compounds converted to hydrogen sulfide in the reformer catalyst from either the combined products at location B or the hydrogen recycle at locations C and D. The disadvantage of these locations not present in location A is that some of the sulfur may remain on the reformer catalyst making it less effective or the hydrogen sulfide produced in the reformer section might react with piping, etc., to form sulfides that can be released into the catalyst system during regeneration to poison the reformer catalyst. In whatever location is used, the ZnO bed is preceded by a chloride scavenging zone.

While the primary objective is to keep sulfur from entering the reformer system, it is also desirable to keep the hydrogen sulfide concentration in the recycle hydrogen as low as possible. The concentration of $H_2S$ in the recycle hydrogen equilibrates at up to five times the concentration in the feed depending upon operating conditions and hydrogen production rate. Therefore, it becomes clear that an efficient adsorbent that includes treating the recycle as is done in all cases herein will result in lower hydrogen sulfide concentrations in the hydrogen recycle than is possible with conventional feed treatment and stripping. The preferred embodiment as discussed above is the process flow diagram with the hydrodesulfurization catalyst bed and adsorbent bed located upstream of the feed heater.

In a system such as this naphtha feed combined with hydrogen recycle, at ratios of 4:1 to 15:1 $H_2$:feed, are first preheated to a temperature of from 550° to 850°F. at a pressure of 150 to 650 psig. This combined stream then enters first the hydrodesulfurization section which contains either nickel molybdenum or cobalt molybdenum desulfurizing catalyst, commercially available to refineries. In this section sulfur compounds are converted to hydrogen sulfide which is carried with the total feed-recycle stream through the adsorbing section which contains preferably zinc oxide adsorbent. These two beds of material can either be two separate vessels to permit changeout on stream and increase the flexibility or can be in one vessel as pictured in the drawing. The treated feed then passes through the feed heater furnace where it is heated to 850° to 950° before passing through the reformer reactor. The reaction products are then separated in the conventional product separator wherein the liquid product is withdrawn and sent to storage for further processing and wherein the hydrogen is taken overhead, compressed, and recycled with the naphtha feed.

It is recognized that HCl in the reformer recycle gas can react with ZnO to form $ZnCl_2$ which in turn can be carried into the reforming zone and adversely affect the catalyst. This problem is overcome by using a commerical chloride scavenger in this system such as a caustic solution in a pretreater or a copper catalyst guard case installed upstream of the ZnO bed. Copper on alumina and copper oxide on alumina catalysts for guard case applications are commercially available. It is estimated the 22,500 pounds each of hydrodesulfurization catalyst and zinc oxide would remove 4 ppm of sulfur from 10,000 bbls/day of naphtha for one year.

The following equilibrium applies to the zinc oxide section.

$$ZnS + H_2O = ZnO + H_2S$$

K, the equilibrium constant for the reaction is defined as $$K = \frac{p_{H_2S}}{p_{H_2O}}$$

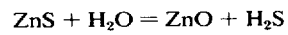

and varies with temperature as follows. At 392°F (200°C), $K = 5.0 \times 10^{-9}$. At 752°F (400°C), $K = 1.8 \times 10^{-6}$. A suitable zinc oxide adsorbent is available from Katalco Corporation, marked Katalco-ICI-32-4 catalyst and is in granular form of ⅛ in. to 3/16 in. diameter with a bulk density of 69 lbs./cu. ft.

Table I shows a series of pilot plant runs with a naphtha feed containing sulfur passed over zinc oxide to remove sulfur from said naphtha feed which is a typical reformer feed. Table II shows the composition of the feedstocks used in these pilot plant runs. Each stock has been run at a series of liquid hourly space velocities and at a series of temperatures and ppm sulfur before and after are shown. As can be seen from a review of these pilot plant runs, the ZnO does a remarkable job in removing sulfur from reformer feed. This process has application not only in catalytic reforming but also in liquid phase desulfurization systems to complete sulfur removal, existing refinery process systems where $H_2S$ stripping is not adequate and to desulfurize already low-sulfur streams in various refinery processes wherein sulfur is a problem.

TABLE I

| Feedstock | Run | Wt.% S in[1] ZnO Bed | Liquid Hourly Space Velocity | Temp. °F | Feed Sulfur ppm | Product Sulfur ppm |
|---|---|---|---|---|---|---|
| A | 1 | 0 | 4 | 625 | 4.4 | 0.1 |
|  | 2 | 11.5% | 4 | 625 | 4.4 | 1.7 |
|  | 3 | 11.5 | 4 | 625 | 4.4 | 0.8 |
|  | 4 | 15.0 | 4 | 625 | 4.4 | 1.5 |
|  | 5 | 0 | 12 | 625 | 4.4 | 0.1 |
|  | 6 | 11.5 | 12 | 625 | 4.4 | 1.8 |
|  | 7 | 11.5 | 12 | 625 | 4.4 | 1.2 |
|  | 8 | 15.0 | 12 | 625 | 4.4 | 2.2 |
|  | 9 | 0 | 6 | 690 | 4.4 | 0.1 |
|  | 10 | 0 | 4 | 750 | 4.4 | 0.1 |

TABLE I - Continued

| Feedstock | Run | Wt.% S in[1] ZnO Bed | Liquid Hourly Space Velocity | Temp. °F | Feed Sulfur ppm | Product Sulfur ppm |
|---|---|---|---|---|---|---|
| | 11 | 11.5 | 4 | 750 | 4.4 | 0.2 |
| | 12 | 15.0 | 4 | 750 | 4.4 | 0.3 |
| | 13 | 0 | 12 | 750 | 4.4 | 0.1 |
| | 14 | 11.5 | 12 | 750 | 4.4 | 0.2 |
| | 15 | 15.0 | 12 | 750 | 4.4 | 0.0 |
| | 16 | 11.5 | 4 | 550 | 4.4 | 1.6 |
| | 17 | 11.5 | 12 | 550 | 4.4 | 1.8 |
| | 18 | 11.5 | 4 | 625 | 4.4 | 1.7 |
| | 19 | 11.5 | 4 | 625 | 4.4 | 0.8 |
| | 20 | 11.5 | 12 | 625 | 4.4 | 1.8 |
| | 21 | 11.5 | 12 | 625 | 4.4 | 1.2 |
| | 22 | 11.5 | 4 | 750 | 4.4 | 0.2 |
| | 23 | 11.5 | 12 | 750 | 4.4 | 0.2 |
| B | 24 | 0 | 12 | 625 | 1.4 | 0.1 |
| | 25 | 15.0 | 12 | 625 | 1.4 | 0.2 |
| | 26 | 15.0 | 4 | 625 | 1.4 | 0.4 |
| | 27 | 0 | 4 | 750 | 1.4 | 0.3 |
| A | 28 | 15.0 | 4 | 625 | 4.4 | 1.5 |
| | 29 | 15.0 | 12 | 625 | 4.4 | 2.2 |
| | 30 | 15.0 | 4 | 750 | 4.4 | 0.3 |
| | 31 | 15.0 | 12 | 750 | 4.4 | 0.0 |
| B | 32 | 0 | 4 | 625 | 1.4 | 0.4 |
| | 33 | 0 | 12 | 625 | 1.4 | 0.2 |

[1] % S on catalyst increases due to ZnS being formed in the ZnO bed. The high levels here were artifically achieved via sulfur loading for the purpose of experimentation.

TABLE II

| | Feed A | Feed B[1] |
|---|---|---|
| API Gravity /60 | 54.2 | 46.2 |
| Sulfur, ppm | 4.4 | 1.4[2] |
| Distillation (Engler) | | |
| initial | 185 | 325 |
| 5% | 208 | 346 |
| 10% | 222 | 349 |
| 30% | 254 | — |
| 50% | 280 | 367 |
| 70% | 309 | — |
| 90% | 343 | 410 |
| 95% | 368 | 427 |
| end point | 414 | 450 |

[1] Actual specifications not available, typical data for this refinery stream substituted.
[2] Actual sulfur on sample used in tests on Table I.

The invention claimed is:

1. A process for catalytically reforming a naphtha feed stream containing sulfur and chloride compounds in the presence of hydrogen which comprises
   a. passing the feed and a hydrogen recycle through a chloride removal zone,
   b. passing the chloride free feed and hydrogen recycle through a hydrodesulfurization zone wherein the sulfur is converted to $H_2S$ and a packed bed of granular zinc oxide absorbent wherein the $H_2S$ is adsorbed,
   c. passing said desulfurized feed through a catalytic reforming zone under reforming conditions wherein reforming of naphthas and conversion of sulfur compounds to $H_2S$ takes place,
   d. withdrawing from step (c) a gaseous stream to be recycled to step (a), and
   e. withdrawing a reformed naphtha product from step (c).

2. The process of claim 1 wherein said catalytic reforming utilizes catalyst selected from the group consisting of platinum on alumina, platinum and rhenium on alumina, platinum and iridium on alumina and platinum, rhenium and iridium on alumina.

3. The process of claim 2 wherein the hydrodesulfurization step utilizes a catalyst selected from the group consisting of cobalt-molybdenum on alumina and nickel-molybdenum on alumina.

4. The process of claim 3 wherein said chloride removal zone is a guard case containing a catalyst selected from the group consisting of copper on alumina and copper oxide on alumina.

5. The process of claim 4 wherein said adsorption takes place at a temperature in the range of 550° to 850°F.

6. The process of claim 5 wherein the reforming catalyst is selected from the group consisting of platinum on alumina, platinum and rhenium on alumina, platinum and iridium on alumina and platinum, rhenium and iridium on alumina, the adsorbent is zinc oxide and the chloride removal zone is a guard case containing a catalyst selected from the group consisting of copper on alumina and copper oxide on alumina.

* * * * *

UNITED STATES PATENT OFFICE
CERTIFICATE OF CORRECTION

PATENT NO. : 3,898,153
DATED : August 5, 1975
INVENTOR(S) : Kenneth E. Louder, William A. Ackerman, Rene F. Kress It is certified that error appears in the above-identified patent and that said Letters Patent are hereby corrected as shown below:

Change inventor's name Irene F. Kress to Rene F. Kress.

Signed and Sealed this twenty-first Day of October 1975

[SEAL]

Attest:

RUTH C. MASON
*Attesting Officer*

C. MARSHALL DANN
*Commissioner of Patents and Trademarks*